United States Patent
Jo et al.

(10) Patent No.: US 11,190,682 B2
(45) Date of Patent: Nov. 30, 2021

(54) ELECTRONIC DEVICE AND METHOD FOR CONTROLLING PLURALITY OF IMAGE SENSORS

(71) Applicant: Samsung Electronics Co., Ltd., Gyeonggi-do (KR)

(72) Inventors: Hyeon-Cheol Jo, Gyeonggi-do (KR); Hwayong Kang, Gyeonggi-do (KR); Dongsoo Kim, Gyeonggi-do (KR); Minyoung Park, Seoul (KR); Sangmin Lee, Gyeonggi-do (KR); Youngkwon Yoon, Seoul (KR); Jonghoon Won, Gyeonggi-do (KR); Kihuk Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/647,366

(22) PCT Filed: Jul. 6, 2018

(86) PCT No.: PCT/KR2018/007671
§ 371 (c)(1),
(2) Date: Mar. 13, 2020

(87) PCT Pub. No.: WO2019/054610
PCT Pub. Date: Mar. 21, 2019

(65) Prior Publication Data
US 2021/0044743 A1    Feb. 11, 2021

(30) Foreign Application Priority Data
Sep. 15, 2017    (KR) .................. 10-2017-0118624

(51) Int. Cl.
*H04N 5/232*    (2006.01)
*H04N 5/225*    (2006.01)

(52) U.S. Cl.
CPC ....... *H04N 5/23227* (2018.08); *H04N 5/2258* (2013.01); *H04N 5/23229* (2013.01); *H04N 5/23241* (2013.01)

(58) Field of Classification Search
CPC ......... H04N 5/04–126; H04N 5/23203; H04N 5/23206; H04N 5/23227;
(Continued)

(56) References Cited

U.S. PATENT DOCUMENTS

2011/0242356 A1 * 10/2011 Aleksic .............. H04N 5/23238
348/222.1
2012/0098980 A1    4/2012 Takahashi et al.
(Continued)

FOREIGN PATENT DOCUMENTS

JP    2011217061    10/2011
JP    2013048333    3/2013
(Continued)

OTHER PUBLICATIONS

PCT/ISA/210 Search Report issued on PCT/KR2018/007671, pp. 5.
(Continued)

*Primary Examiner* — Paul M Berardesca
(74) *Attorney, Agent, or Firm* — The Farrell Law Firm, P.C.

(57) ABSTRACT

An electronic device according to various embodiments can include: a first image sensor; a second image sensor electrically connected to the first image sensor through a first designated interface; and a processor connected to the first image sensor through a second designated interface and connected to the second image sensor through a third designated interface, wherein the processor can be set to obtain, from the second image sensor, a second image outputted through the third designated interface, and obtain, from the first image sensor, a first image outputted through
(Continued)

the second designated interface, in response to a signal provided to the first image sensor through the first designated interface at the starting time of the output of the second image.

12 Claims, 9 Drawing Sheets

(58) Field of Classification Search
CPC . H04N 1/00931–00933; H04N 5/2258; H04N 5/247; H04N 2101/00; H04N 13/167; H04N 13/20–296
See application file for complete search history.

(56) References Cited

U.S. PATENT DOCUMENTS

| | | | |
|---|---|---|---|
| 2016/0261807 A1* | 9/2016 | Seshadrinathan .. | H04N 5/23206 |
| 2017/0085755 A1 | 3/2017 | Kim et al. | |
| 2018/0376076 A1* | 12/2018 | Park ..................... | H04N 5/3415 |
| 2019/0124235 A1* | 4/2019 | Mitsubayashi ........ | H04N 5/232 |
| 2020/0099914 A1* | 3/2020 | Otsubo ................. | H04N 13/239 |
| 2021/0099628 A1* | 4/2021 | Nakamura ............. | H04N 5/067 |

FOREIGN PATENT DOCUMENTS

| KR | 1020050098401 | 10/2005 |
|---|---|---|
| KR | 1020080006902 | 1/2008 |
| KR | 1020080007773 | 1/2008 |
| KR | 1020130021096 | 3/2013 |
| KR | 1020140018471 | 2/2014 |
| KR | 1020160012743 | 2/2016 |
| KR | 1020170035690 | 3/2017 |

OTHER PUBLICATIONS

PCT/ISA/237 Written Opinion issued on PCT/KR2018/007671, pp. 6.
Korean Office Action dated Jul. 1, 2021 issued in counterpart application No. 10-2017-0118624, 15 pages.

* cited by examiner

ELECTRONIC DEVICE AND METHOD FOR CONTROLLING PLURALITY OF IMAGE SENSORS

PRIORITY

This application is a National Phase Entry of PCT International Application No. PCT/KR2018/007671, which was filed on Jul. 6, 2018, and claims priority to Korean Patent Application No. 10-2017-0118624, which was filed on Sep. 15, 2017, the content of each of which are incorporated herein by reference.

TECHNICAL FIELD

Various embodiments relate to an electronic device for controlling a plurality of image sensors and a method thereof.

BACKGROUND ART

Due to development of technology, demands for images of various types are increasing. To provide such images, an electronic device including a plurality of image sensors is supplied.

DISCLOSURE OF INVENTION

Technical Problem

An electronic device may include a plurality of image sensors, to provide images of various types. The plurality of the image sensors each may have different characteristics. Such characteristic difference may improve an image quality provided from the electronic device, but may cause a tradeoff. For example, the plurality of the images each may transmit data for the image to a processor based on different transmission timings. This difference of the transmission timing may cause a distortion in the image provided by the electronic device.

Various embodiments may provide an electronic device and a method for synchronizing transmission timings of data transmitted from a plurality of image sensors.

Technical problems to be achieved in the present disclosure are not limited to the above-mentioned technical problems, and other technical problems not mentioned will be clearly understood by those skilled in the art to which the present invention belongs from the following descriptions.

Solution to Problem

An electronic device according to various embodiments may include a first image sensor, a second image sensor electrically connected with the first image sensor through a first designated interface, and a processor connected with the first image sensor through a second designated interface and connected with the second image sensor through a third designated interface, and the processor may be configured to obtain a second image outputted from the second image sensor through the third designated interface, and obtain a first image outputted from the first image sensor through the second designated interface in response to a signal provided to the first image sensor through the first designated interface at an initiation timing for outputting the second image.

An electronic device according to various embodiments may include a processor, a first image sensor connected with the processor through a first interface, a second image sensor connected with the processor through a second interface, and a third interface configured to connect the first image sensor and the second image sensor to synchronize a transmission timing of first data transmitted from the first image sensor to the processor through the first interface and a transmission timing of second data transmitted from the second image sensor to the processor through the second interface.

A method of an electronic device according to various embodiments may include obtaining, at a processor of the electronic device, a second image outputted from a second image sensor of the electronic device through a third designated interface, and obtaining, at the processor, a first image outputted from the first image sensor through a second designated interface in response to a signal provided from the second image sensor to the first image sensor through the first designated interface at an initiation timing for outputting the second image.

Advantageous Effects of Invention

An electronic device and its method according to various embodiments may provide an image of an enhanced quality, synchronizing transmission timings of data transmitted from a plurality of image sensors.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Figure 1:
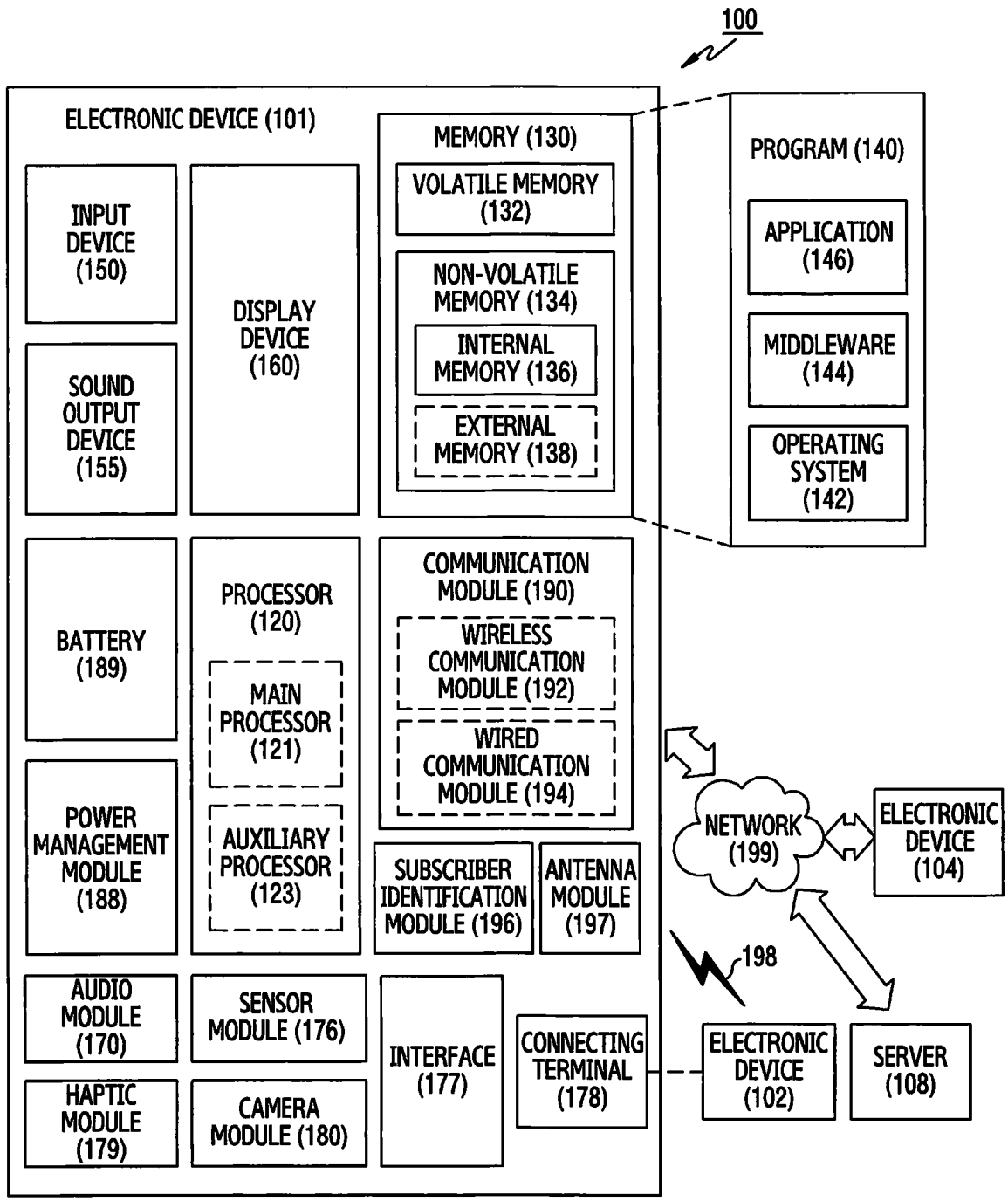
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
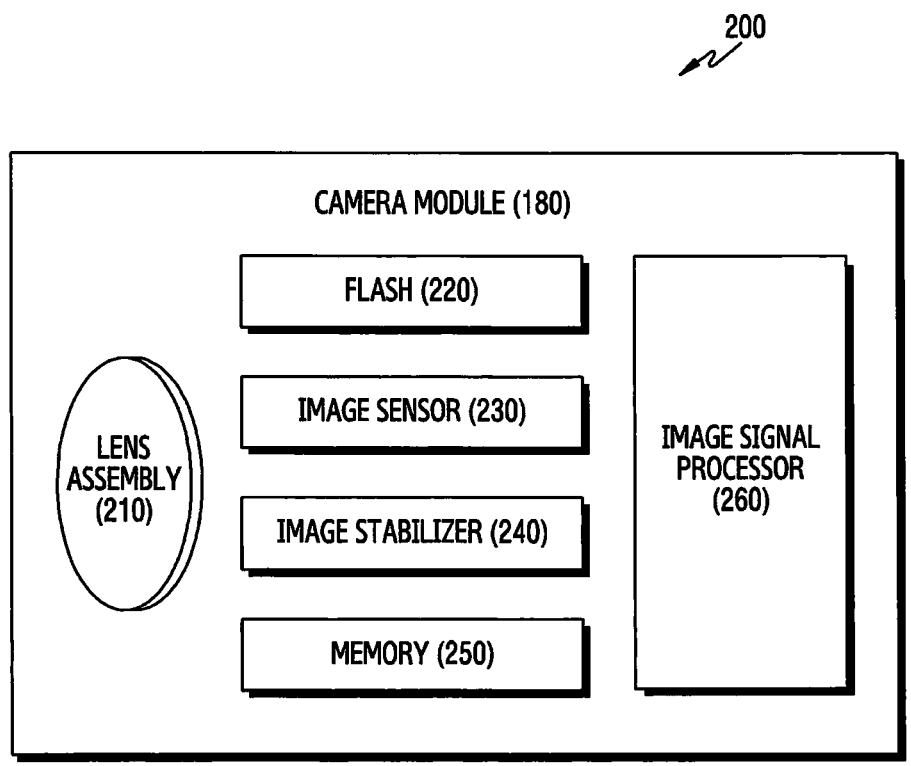
FIG. 2 is a block diagram of a camera module, according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
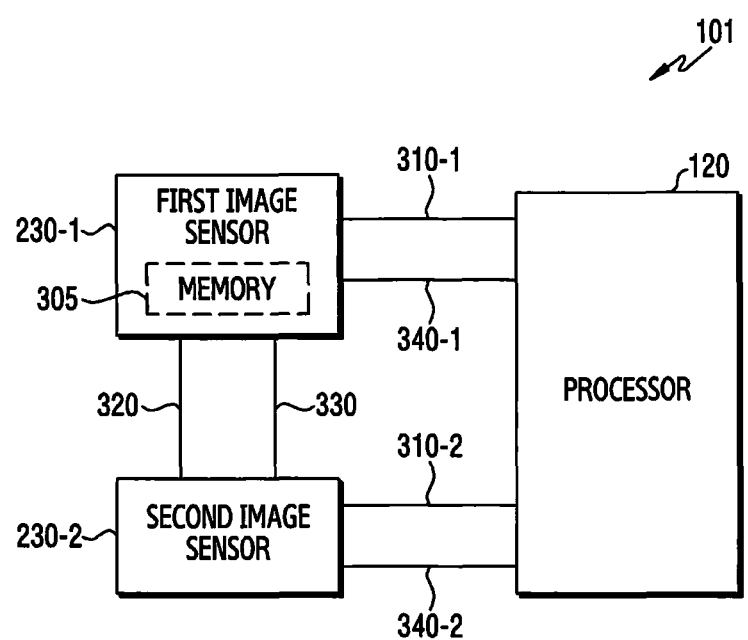
FIG. 3 illustrates an example of a functional configuration of an electronic device according to various embodiments.

FIG. 3 illustrates an example of a functional configuration of an electronic device according to various embodiments. Such a functional configuration may be included in the electronic device 101 of FIG. 1.

Figure 4:
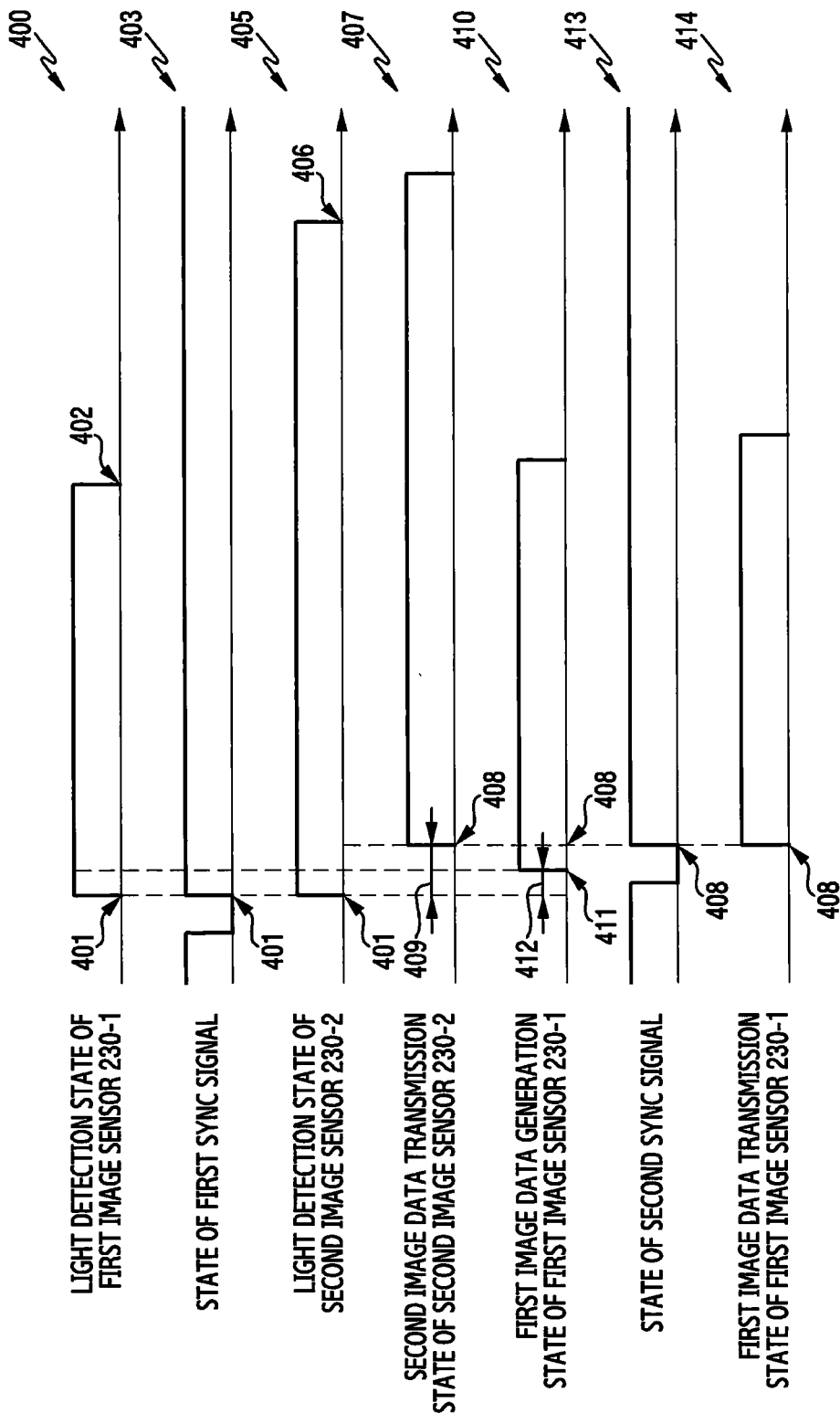
FIG. 4 are graphs for showing states related to an electronic device according to various embodiments.

FIG. 4 are graphs for showing states related to an electronic device according to various embodiments.

Referring to FIG. 3, the electronic device 101 may include a processor 120, a first image sensor 230-1, and a second image sensor 230-2.

The processor 120 may control general operations of the electronic device 101. The processor 120 may receive commands of other components (e.g., the image sensor 230-1, the image sensor 230-2, etc.) of the electronic device 101, interpret the received commands, and perform a calculation or process the data according to the interpreted command.

The processor 120 may process the data or signals provided from the other components of the electronic device 101. For example, the processor 120 may request an instruction, data, or a signal from a memory (not shown, e.g., the memory 130 of FIG. 1) of the electronic device 101, to process the data or the signal. To process the data or the signal, the processor 120 may record (or store) or update the instruction, the data, or the signal in the memory. The processor 120 may provide the processed data or the processed signal to other components of the electronic device 101 such as the memory, the first image sensor 230-1, or the second image sensor 230-2.

Whole or part of the processor 120 may be electrically or operably or operatively coupled to or connected to other component (e.g., the first image sensor 230-1, the second image sensor 230-2, the memory, etc.) of the electronic device 101.

In various embodiments, the processor 120 may be connected to the first image sensor 230-1, through an interface (or a designated interface) 310-1. To obtain first image data through the first image sensor 230-1, the processor 120 may transmit control information, a command, or a request to the first image sensor 230-1 through the interface 310-1. For example, the processor 120 may provide the control information, the command, or the request to the first image sensor 230-1 through the interface 310-1, so that the first image sensor 230-1 generates the first image data based on light detected through a first lens (not shown) connected to the first image sensor 230-1. The processor 120 may be connected to the second image sensor 230-2, through an interface 310-2. To obtain second image data through the second image sensor 230-2, the processor 120 may transmit control information, a command, or a request to the second image sensor 230-2 through the interface 310-2. For example, the processor 120 may provide the control information, the command, or the request to the second image sensor 230-2 through the interface 310-2, so that the second image sensor 230-2 generates the second image data based on light detected through a second lens (not shown) connected to the second image sensor 230-2.

The interface 310-1 may be used to connect the first image sensor 230-1 and the processor 120. The interface 310-1 may provide a communication path between the first image sensor 230-1 and the processor 120. The interface 310-1 may be configured to provide the control information, the command, or the request transmitted from the processor 120 to the first image sensor 230-1. For example, the interface 310-1 may be an interface for inter integrated circuit (I2C) communication, an interface for serial peripheral interface (SPI) communication, or an interface for general purpose input/output (GPIO) communication.

The interface 310-2 may be used to connect the second image sensor 230-2 and the processor 120. The interface 310-2 may provide a communication path between the second image sensor 230-2 and the processor 120. The interface 310-2 may be configured to provide the control information, the command, or the request transmitted from the processor 120 to the second image sensor 230-2. For example, the interface 310-2 may be an interface for the I2C communication, an interface for the SPI communication, or an interface for the GPIO communication. In various embodiments, the interface 310-2 may not be included in the electronic device 101.

In various embodiments, the processor 120 may be connected to the first image sensor 230-1, through an interface 340-1. The processor 120 may receive the first image data from the first image sensor 230-1 through the interface 340-1. The processor 120 may be connected to the second image sensor 230-2, through an interface 340-2. The processor 120 may receive the second image data from the second image sensor 230-2 through the interface 340-2.

The interface 340-1 may be used to connect the first image sensor 230-1 and the processor 120. The interface 340-1 may provide a communication path between the first image sensor 230-1 and the processor 120. The interface 340-1 may be configured to provide the first image data transmitted from the first image sensor 230-1 to the processor 120. For example, the interface 340-1 may be an interface for mobile industry processor interface (MIPI) communication.

The interface 340-2 may be used to connect the second image sensor 230-2 and the processor 120. The interface 340-2 may provide a communication path between the second image sensor 230-2 and the processor 120. The interface 340-2 may be configured to provide the second image data transmitted from the second image sensor 230-2 to the processor 120. For example, the interface 340-2 may be an interface for the MIPI communication.

In various embodiments, the processor 120 may generate an image based at least on the first image data or the second image data. The processor 120 may generate the image, by performing designated image processing (e.g., perform while balance, etc.) on at least one or more of the first image data or the second image data. The image may have various formats. The image may be an image which synthesizes the first image data and the second image data. In various embodiments, at least part of the image may be blurred compared with at least other part of the image by the synthesis of the first image data and the second image data. For example, the image may have a depth effect. In various embodiments, the image may have an enhanced resolution thanks to the synthesis of the first image data and the second image data. In various embodiments, the image may have an enhanced brightness thanks to the synthesis of the first image data and the second image data. The image, which is the image which synthesizes the first image data generated based on the light received through the first lens and the second image data generated based on the light received through the second lens, may have the enhanced brightness. In various embodiments, the image may be a panorama image. In various embodiments, the image may be an omnidirectional image. In various embodiments, the image may be an image acquired through a dual camera.

According to embodiments, the processor 120 may be configured with one or more processors. For example, the processor 120 may include one or more of an application processor (AP) for controlling a program of a high layer such as an application program, a communication processor (CP) for controlling the communication, or an image signal processor (ISP) (e.g., the image signal processor 260) for processing the image.

The first image sensor 230-1 may be used to generate the first image data. The first image sensor 230-1 may detect the light through the first lens which is functionally connected with the first image sensor 230-1, based at least on the control information, the command, or the request received (or obtained) from the processor 120 through the interface 310-1. The first image sensor 230-1 may generate first analog image data based at least on the light detected through the first lens. The first image sensor 230-1 may generate first digital image data based on the first analog image data. The first image sensor 230-1 may generate the first digital image data, by applying analog digital convert (ADC) to the first analog image data. The first image sensor 230-1 may generate the first digital image data converted from the first analog image data as the first image data. The first image sensor 230-1 may transmit or provide the first image data to the processor 120 through the interface 340-1. For example, the first image sensor 230-1 may transmit or provide the first image data on a line basis to the processor 120 through the interface 340-1. As another example, the first image sensor 230-1 may transmit or provide the first image data on a frame basis to the processor 120 through the interface 340-1.

The first image sensor 230-1 may include a memory 305. The first image sensor 230-1 may include the memory 305 for the first image data. The memory 305 may be used to temporarily store the first image data. The memory 305 may be configured to temporarily store the first image data, to synchronize a transmission timing of the first image data transmitted to the processor 120 with a transmission timing of the second image data transmitted to the processor 120. The memory 305 may be referred to as a buffer or a line memory. According to embodiments, the memory 305 may not be included in the first image sensor 230-1.

The second image sensor 230-2 may be used to generate the second image data. The second image sensor 230-2 may detect the light through the second lens which is functionally connected with the second image sensor 230-2, based at least on the control information, the command, or the request received (or obtained) from the processor 120 through the interface 310-2. The second image sensor 230-2 may generate second analog image data based at least on the light detected through the second lens. The second image sensor 230-2 may generate second digital image data based on the second analog image data. The second image sensor 230-2 may generate the second digital image data, by applying the ADC to the second analog image data. The second image sensor 230-2 may generate the second digital image data converted from the second analog image data as the second image data. The second image sensor 230-2 may transmit or provide the second image data to the processor 120 through the interface 340-2. For example, the second image sensor 230-2 may transmit or provide the second image data on a line basis to the processor 120 through the interface 340-2. As another example, the second image sensor 230-2 may transmit or provide the second image data on a frame basis to the processor 120 through the interface 340-2.

An interface 320 may be used to connect the first image sensor 230-1 and the second image sensor 230-2. The interface 320 may provide a communication path between the first image sensor 230-1 and the second image sensor 230-2. The interface 320 may provide a first sync signal transmitted from the first image sensor 230-1 to the second image sensor 230-2. The first sync signal may be used to synchronize a timing for detecting the light through the second lens connected to the second image sensor 230-2 with a timing for detecting the light through the first lens connected to the first image sensor 230-1. The first sync signal may be transmitted from the first image sensor 230-1 to the second image sensor 230-2 through the interface 320. The first sync signal may have a power level (or a voltage level) configured with a plurality of values. For example, the power level of the first sync signal may be configured with a first value and a second value which is lower than the first value.

The first image sensor 230-1 may change the power level of the first sync signal, to synchronize the timing for detecting the light through the second lens connected to the second image sensor 230-2 with the timing for detecting the light through the first lens connected to the first image sensor 230-1. In various embodiments, the first image sensor 230-1 may receive a signal (or information) for requesting the first image data from the processor 120 through the interface 310-1. In response to receiving the signal, the first image sensor 230-1 may initiate detecting the light received through the first lens. In response to receiving the signal, the first image sensor 230-1 may identify or determine the timing for detecting the light received through the first lens. In response to the identification or the determination, the first image sensor 230-1 may change the power level of the first sync signal. For example, the first image sensor 230-1 may change the power level of the first sync signal from the first value to the second value. As another example, the first image sensor 230-1 may change the power level of the first sync signal from the second value to the first value. The first image sensor 230-1 may transmit the first sync signal having the changed power level to the second image sensor 230-2 through the interface 320. The second image sensor 230-2 may receive the first sync signal through the interface 320. The second image sensor 230-2 may identify that the power level of the first sync signal received through the interface 320 is changed. In response to changing the power level (or identifying the change of the power level), the second image sensor 230-2 may initiate detecting the light received through the second lens.

An interface 330 may be used to connect the first image sensor 230-1 and the second image sensor 230-2. The interface 330 may provide a communication path between the first image sensor 230-1 and the second image sensor 230-2. The interface 330 may provide a second sync signal transmitted from the second image sensor 230-2 to the first image sensor 230-1. A time required by the second image sensor 230-2 to generate the second image data (or a time required by the second image sensor 230-2 to initiate generating the second image data) may be longer than a time required by the first image sensor 230-1 to generate the first image data (or a time required by the first image sensor 230-1 to initiate generating the first image data). In other words, the timing for generating the second image data may be behind the timing for generating the first image data. A difference between the timing for generating the first image data and the timing for generating the second image data may cause a difference between the timing for transmitting the first image data and the timing for transmitting the second image data. Such a difference between the transmission timings may cause a distortion in an image generated based on the first image data and the second image data. To prevent such a distortion, the electronic device 101 may use the second sync signal. The second sync signal may be used to synchronize the timing for transmitting the first image data transmitted from the first image sensor 230-1 to the processor 120 with the timing for transmitting the second image data transmitted from the second image sensor 230-2 to the processor 120. The second sync signal may be transmitted from the second image sensor 230-2 to the first image sensor 230-1 through the interface 330. The second sync signal may have a power level configured with a plurality of values. For example, the power level of the second sync signal may be configured with a third value and a fourth value which is lower than the third value.

The time required by the second image sensor 230-2 to generate the second image data may be longer than the time required by the first image sensor 230-1 to generate the first image data. In other words, the second image data may be generated after the first image data. To make up for this difference of the generation timing, the first image sensor 230-1 may store or temporarily store at least part of the generated first image data in the memory 305. To delay the transmission timing of the first image data, the first image sensor 230-1 may store at least part of the first image data in the memory 305.

To compensate for the difference of the generation timing, the second image sensor 230-2 may use the second sync signal. The second image sensor 230-2 may change the power level of the second sync signal, to synchronize the transmission timing of the first image data and the transmission timing of the second image data. For example, the second image sensor 230—may change the power level of the second sync signal from the third value to the fourth value. As another example, the second image sensor 230-2 may change the power level of the second sync signal from the fourth value to the third value. The second image sensor 230-2 may transmit the second sync signal having the changed power level to the first image sensor 230-1 through the interface 330. The first image sensor 230-1 may receive the second sync signal through the interface 330. The first image sensor 230-1 may identify that the power level of the second sync signal received through the interface 330 is changed. In response to changing the power level (or identifying the change of the power level), the first image sensor 230-1 may transmit the first image data to the processor 120 through the interface 340-1. In response to the change of the power level, the first image sensor 230-1 may transmit at least part of the first image data stored in the memory 305 to the processor 120 through the interface 340-1, and then transmit at least other part of the image data to the processor 120 through the interface 340-1.

Meanwhile, in response to the change of the power level (or arrival of the second image data generation timing), the second image sensor 230-2 may transmit the second image data to the processor 120 through the interface 340-2.

For example, referring to FIG. 4, in response to obtaining a request from the processor 120 through the interface 310-1, the first image sensor 230-1 may initiate detecting the light received through the first lens, as shown in a graph 400. A horizontal axis of the graph 400 may indicate the time, and a vertical axis of the graph 400 may indicate the light detection state of the first image sensor 230-1. In response to obtaining the request, the first image sensor 230-1 may initiate detecting the light received through the first lens at a timing 401. Detecting the light received through the first lens may finish at a timing 402. The first image sensor 230-1 may detect the light received through the first lens during or within a time period from the timing 401 to the timing 402.

As shown in a graph 403, the first image sensor 230-1 may change the state of the first sync signal from a first state to a second state, in response to initiating the detection of the light received through the first lens. The horizontal axis of the graph 403 may indicate the time, and the vertical axis of the graph 403 may indicate the state of the first sync signal. For example, in response to initiating the detection of the light received through the first lens, the first image sensor 230-1 may change the power level of the first sync signal from the second value to the first value which is higher than the second value at the timing 401. To synchronize the timing for detecting the light through the second lens with the timing for detecting the light through the first lens, the first image sensor 230-1 may change the power level of the first sync signal from the second value to the first value which is higher than the second value. While the power level of the first sync signal is changed from the second value to the first value in FIG. 4, this configuration may change according to a design choice. For example, the power level of the first sync signal may be changed from the first value to the second value.

As shown in a graph 405, the second image sensor 230-2 may initiate detecting the light received through the second lens, in response to identifying that the state of the first sync signal received at the second image sensor 230-2 from the first image sensor 230-1 through the interface 320 is changed from the first state to the second state. The horizontal axis of the graph 405 may indicate the time, and the vertical axis of the graph 405 may indicate the light detection state of the second image sensor 230-2. In response to the state change of the first sync signal, the second image sensor 230-2 may initiate detecting the light received through the second lens at the timing 401. Detecting the light received through the second lens may finish at a timing 406. The second image sensor 230-2 may detect the light received through the second lens during or within the time period from the timing 401 to the timing 406.

As show in a graph 407, the second image sensor 230-2 may generate and transmit the second image data, based at least on the light detected through the second lens. The horizontal axis of the graph 407 may indicate the time, and the vertical axis of the graph 407 may indicate the generation state of the second image data of the second image sensor 230-2 or the transmission state of the second image data. Based at least on the light detected through the second lens, the second image sensor 230-2 may generate and transmit the second image data at a timing 408. A time period from the timing 401 to the timing 408 may indicate the time period required to generate the second image data. Based at least on the light detected through the second lens, the second image sensor 230-2 may generate and transmit the second image data after the time period 409 from the timing 401.

Meanwhile, as shown in a graph 410 the first image sensor 230-1 may generate the first image data, based at least on the light detected through the first lens. The horizontal axis of the graph 410 may indicate the time, and the vertical axis of the graph 410 may indicate the generation state of the first image data of the first image sensor 230-1. Based at least on the light detected through the first lens, the first image sensor 230-1 may generate the first image data at a timing 411. A time period 412 from the timing 401 to the timing 411 may indicate the time period required to generate the first image data. The time period 412 may be different from the time period 409, because characteristics (e.g., an image processing rate) of the first image sensor 230-1 may be different from characteristics of the second image sensor 230-2. If the first image sensor 230-1 generates and transmits the first image data without delay as in the second image sensor 230-2 of the graph 407, the transmission timing (e.g., the timing 411) of the first image data may be different from the transmission timing (e.g., the timing 408) of the second image data. This difference between the transmission timings may cause a distortion such as order error of a Bayer pattern in the image generated based at least on the first image data and the second image data. To prevent this distortion, the first image sensor 230-1 may delay the transmission of the first image data until detecting (or identifying) that the state of the second sync signal is changed. For the delay, the first image sensor 230-1 may store or temporarily store at least part of the first image data in the memory 305.

As shown in a graph 413, in response to transmitting the second image data to the processor 120 through the interface 340-2, the second image sensor 230-2 may change the state of the second sync signal from the first state to the second state. The horizontal axis of the graph 413 may indicate the time, and the vertical axis of the graph 413 may indicate the state of the second sync signal. For example, at the timing 408 which initiates the transmission of the second sync signal, the second image sensor 230-2 may change the power level of the second sync signal from the fourth value to the third value which is higher than the fourth value. While the power level of the second sync signal is changed from the fourth value to the third value in FIG. 4, such a configuration may change according to the design choice. For example, the power level of the second sync signal may be changed from the third value to the fourth value.0

As shown in a graph 414, the first image sensor 230-1 may initiate the transmission of the first image data, in response to identifying that the state of the second sync signal received at the first image sensor 230-1 from the second image sensor 230-2 through the interface 330 is changed from the first state to the second state. The horizontal axis of the graph 414 may indicate the time, and the vertical axis of the graph 414 may indicate the transmission state of the first image data of the first image sensor 230-1. In response to the state change of the second sync signal, the first image sensor 230-1 may initiate the transmission of the first image data at the timing 408. The image sensor 230-1 may initiate the transmission of at least part of the first image data stored in the memory 305 through the interface 340-1. In other words, the transmission timing of the first image data may correspond to or be identical to the transmission timing of the second image data.

While FIG. 3 and FIG. 4 illustrate the example in which the second image sensor 230-2 generates the second image data at the timing 408 which is behind the timing 411 at which the first image sensor 230-1 generates the first image data, it should be noted that the second image data may be generated before the first image data. In this case, the second image sensor 230-2 may include a memory such as the memory 305. By storing or temporarily storing at least part of the second image data in the memory 305, the second image sensor 230-2 may delay the transmission timing of the second image data up to the generation timing 411 of the first image data. Based on the delay (or in response to the arrival of the timing 411), the second image sensor 230-2 may synchronize the transmission timing of the first image data and the transmission timing of the second image data, by transmitting at least part of the second image data and concurrently changing the state of the second sync signal.

As stated above, the electronic device 101 according to various embodiments may synchronize the transmission timing of the first image data and the transmission timing of the second image data, by using the sync signal transmitted from the second image sensor 230-2 to the first image sensor 230-1 through the interface 330 configured to connect the first image sensor 230-1 and the second image sensor 230-2. In other words, the electronic device 101 may synchronize the timing of receiving the first image data at the processor 120 and the timing of receiving the second image data at the processor 120. By means of the synchronization, the electronic device 101 according to various embodiments may prevent the distortion caused in the image generated based at least on the first image data and the second image data. Based on the synchronization, the electronic device 101 according to various embodiments may provide the image of the enhanced quality.

Figure 5:
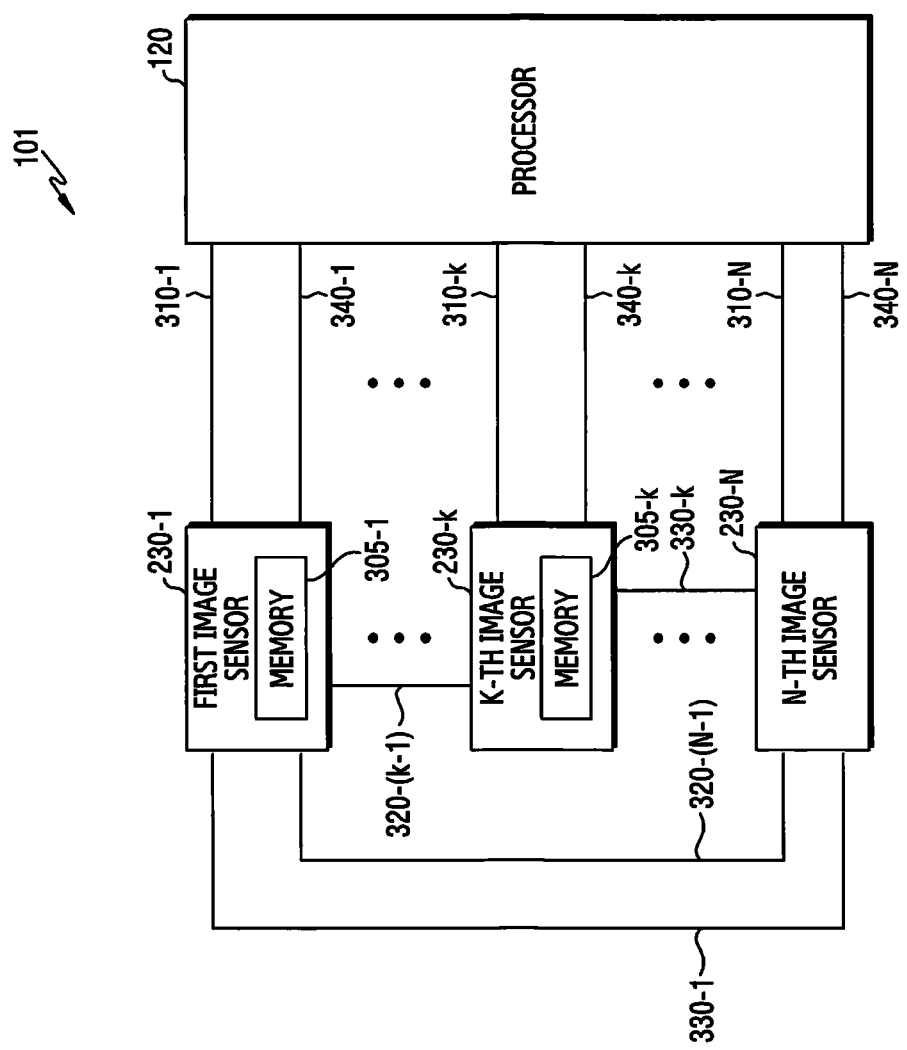
FIG. 5 illustrates another example of a functional configuration of an electronic device according to various embodiments.

FIG. 5 illustrates another example of a functional configuration of an electronic device according to various embodiments. This functional configuration may be included in the electronic device 101 of FIG. 1.

Figure 6:
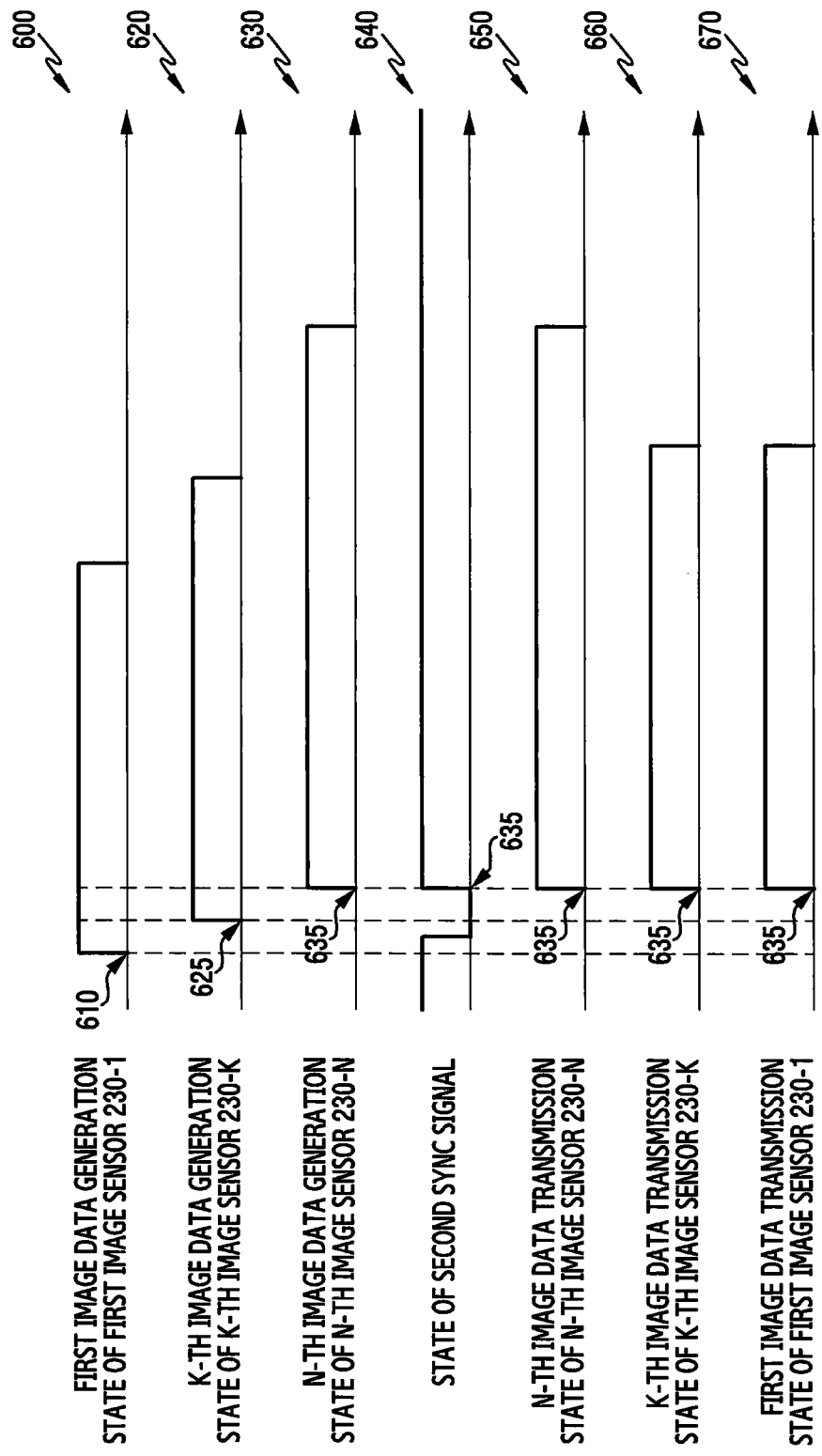
FIG. 6 are graphs for showing states related to an electronic device according to various embodiments.

FIG. 6 are graphs for showing states related to an electronic device according to various embodiments.

Figure 7:
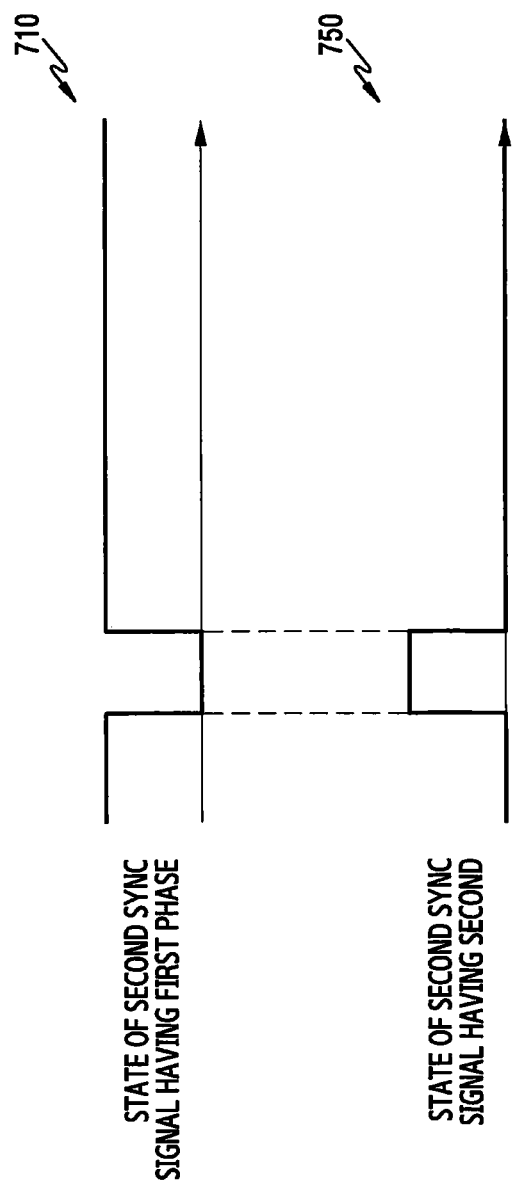
FIG. 7 illustrates an example of a second sync signal according to various embodiments.

FIG. 7 illustrates an example of a second sync signal according to various embodiments.

Referring to FIG. 5, the electronic device 101 may include a processor 120 and a plurality of image sensors (e.g., a first image sensor 230-1, . . . , a K-th image sensor 230-K, . . . , an N-th image sensor 230-N, etc.).

The processor 120 may correspond to the processor 120 of FIG. 3.

The plurality of the image sensors each may correspond to the first image sensor 230-1 or the second image sensor 230-2 of FIG. 3.

At least part of the plurality of the image sensors may generate image data at different timings from at least other part of the plurality of the image sensors. For example, the timing at which the first image sensor 230-1 generates first image data based at least on the light detected through first lens connected to the first image sensor 230-1 may be different from the timing at which the K-th image sensor 230-K generates K-th image data based at least on the light detected through a K-th lens connected to the K-th image sensor 230-K or the timing at which the N-th image sensor 230-N generates N-th image data based at least on the light detected through an N-th lens connected to the N-th image sensor 230-N. Since at least part of the plurality of the image sensors may have different characteristics from characteristics of at least other part of the plurality of the image sensors, the timing at which at least part of the plurality of the image sensors generate the image data may be different from the timing at which at least other part of the plurality of the image sensors generate the image data.

The plurality of the image sensors each may receive a signal for requesting to initiate the light detection (or requesting the image data) from the processor 120. For example, the first image sensor 230-1 may receive a signal for requesting the first image data from the processor 120 through the interface 310-1, the K-th image sensor 230-K may receive a signal for requesting the K-th image data from the processor 120 through an interface 310-K, and the N-th image sensor 230-N may receive a signal for requesting the N-th image data from the processor 120 through an interface 310-N.

The plurality of the image sensors each may transmit or provide to the processor 120 the image data generated based at least on the light detected through the lens connected to the plurality of the image sensors. For example, the first image sensor 230-1 may transmit to the processor 120 the first image data generated based at least on the light detected through the first lens, the K-th image sensor 230-K may transmit to the processor 120 the K-th image data generated based at least on the light detected through the K-th lens, and the N-th image sensor 230-N may transmit to the processor 120 the N-th image data generated based at least on the light detected through the N-th lens.

In response to a request of the processor, the first image sensor 230-1 may detect the light received through the first lens. In response to a request of the processor, the first image sensor 230-1 may change the state of the first sync signal transmitted from the first image sensor 230-1 to other image sensors (e.g., the K-th image sensor 230-K, the N-th image sensor 230-N, etc.) than the first image sensor 230-1 among the plurality of the image sensors through the interface 320. For example, the first image sensor 230-1 may change the power level of the first sync signal transmitted from the first image sensor 230-1 to the K-th image sensor 230-K through an interface 320-(K−1). As another example, the first image sensor 230-1 may change the power level of the first sync signal transmitted from the first image sensor 230-1 to the N-th image sensor 230-N through an interface 320-N.

In response to the change of the power level of the first sync signal, the K-th image sensor 230-K may detect the light received through the K-th lens. In response to the change of the power level of the first sync signal, the N-th image sensor 230-N may detect the light received through the N-th lens.

The first image sensor 230-1 may generate the first image data based at least on the detected light, the K-th image sensor 230-K may generate the K-th image data based at least on the detected light, and the N-th image sensor 230-N may generate the N-th image data based at least on the detected light.

At least part of the first image data generation timing, the K-th image data generation timing, and the N-th image data generation timing may be different from at least other part of them.

For example, referring to FIG. 6, a graph 600 may depict the generation state of the first image data of the first image sensor 230-1. The horizontal axis of the graph 600 may indicate the time, and the vertical axis of the graph 600 may indicate the generation state of the first image data of the first image sensor 230-1. As shown in graph 600, the first image sensor 230-1 may initiate the generation of the first image data at a timing 610.

A graph 620 may depict the generation state of the K-th image data of the K-th image sensor 230-K. The horizontal axis of the graph 620 may indicate the time, and the vertical axis of the graph 620 may indicate the generation state of the K-th image data of the K-th image sensor 230-K. As shown in graph 620, the K-th image sensor 230-K may initiate the generation of the K-th image data at a timing 625 different from the timing 610.

A graph 630 may depict the generation state of the N-th image data of the N-th image sensor 230-N. The horizontal axis of the graph 630 may indicate the time, and the vertical axis of the graph 630 may indicate the generation state of the N-th image data of the N-th image sensor 230-N. As shown in graph 630, the N-th image sensor 230-N may initiate the generation of the N-th image data at a timing 635 different from the timing 610 and the timing 625.

As described above, at least part of the first image data generation timing, the K-th image data generation timing, and the N-th image data generation timing may be different from at least other part of the first image data generation timing, the K-th image data generation timing, and the N-th image data generation timing. This difference of the generation timing may result from the different time per image sensors from the light detection timing to the ADC timing.

If the first image sensor 230-1, the K-th image sensor 230-K, and the N-th image sensor 230-N each generate the image data and then transmit it without delay, at least part of the transmission timing of the first image data, the transmission timing of the K-th image data, and transmission timing of the N-th image data may be different from at least other part of the transmission timing of the first image data, the transmission timing of the K-th image data, and transmission timing of the N-th image data. This difference between the transmission timings may cause a distortion in an image data generated based at least on the first image data, the K-th image data, and the N-th image data. To prevent such a distortion, the plurality of the image sensors (e.g., the first image sensor 230-1, the K-th image sensor 230-K, and the N-th image sensor 230-N, etc.) may perform the following operations.

The N-th image sensor 230-N which generates the image data the latest among the plurality of the image sensors may generate the the N-th image data and transmit the N-th image data to the processor 120 through the interface 340-N without delaying it. For example, as shown in a graph 650, the N-th image sensor 230-N may transmit the N-th image data to the processor 120 through the interface 340-N. The horizontal axis of the graph 650 may indicate the time, and the vertical axis of the graph 650 may indicate the transmission state of the N-th image data of the N-th image sensor 230-N. The N-th image sensor 230-N may transmit the N-th image data to the processor 120 through the interface 340-N at a timing 635 at which the N-th image data is generated.

In response to transmitting the N-th image data (or generating the N-th image data), the N-th image sensor 230-N may change the second sync signal which is transmitted from the N-th image sensor 230-N to each of other image sensors than the N-th image sensor 230-N among the plurality of the image sensors through the interface 330. For example, as shown in a graph 640, in response to the transmission of the N-th image data, the N-th image sensor 230-N may change the power level of second sync signal transmitted from the N-th image sensor 230-N to the first image sensor 230-1 through the interface 330-1. The horizontal axis of the graph 640 may indicate the time, and the vertical axis of the graph 640 may indicate the state of the second sync signal. In response to the transmission of the N-th image data, the N-th image sensor 230-N may change the power level of the second sync signal transmitted from the N-th image sensor 230-N to the first image sensor 230-1 through the interface 330-1 at the timing 635 which is the transmission timing of the N-th image data.

To match the transmission timing of the first image data to the transmission timing of the N-th image data, the first image sensor 230-1 may store at least part of the first image data in a memory 305-1. As shown in a graph 670, the first image sensor 230-1 may transmit the first image data to the processor 120 through the interface 340-1, in response to the change of the second sync signal. The horizontal axis of the graph 670 may indicate the time, and the vertical axis of the graph 670 may indicate the transmission state of the first image data of the first image sensor 230-1. In response to the change of the power level of the second sync signal, the first image sensor 230-1 may transmit the first image data, at the timing 635 which is the transmission timing of the N-th image data. In other words, through the state change of the second sync signal, the electronic device 101 according to various embodiments may match the transmission timing of the first image data to the transmission timing of the N-th image data.

To match the transmission timing of the K-th image data to the transmission timing of the N-th image data, the K-th image sensor 230-K may store at least part of the K-th image data in a memory 305-K. As shown in a graph 660, the K-th image sensor 230-K may transmit the K-th image data to the processor 120 through the interface 340-K, in response to the change of the second sync signal. The horizontal axis of the graph 660 may indicate the time, and the vertical axis of the graph 660 may indicate the transmission state of the K-th image data of the K-th image sensor 230-K. In response to the change of the power level of the second sync signal, the K-th image sensor 230-K may transmit the K-th image data, at the timing 635 which is the transmission timing of the N-th image data. In other words, through the state change of the second sync signal, the electronic device 101 according to various embodiments may match the transmission timing of the K-th image data to the transmission timing of the N-th image data.

In various embodiments, a phase of at least part of the second sync signals transmitted from the N-th image sensor 230-N to other image sensors respectively than the N-th image sensor 230-N among the plurality of the image sensors may be different from a phase of at least other prat of the second sync signals. For example, the N-th image sensor 230-N may set the phase of at least part of the second sync signals to be different from the phase of at least other part of the second sync signals, so that the second sync signals become robust to interference caused between the second sync signals. For example, referring to FIG. 7, a graph 710 may show the state of the second sync signal having a first phase, and a graph 750 may show the state of the second sync signal having a second phase. The horizontal axis of the graph 710 and the graph 750 may indicate the time, and the vertical axis of the graph 710 and the graph 750 may indicate the state of the second sync signal.

For example, the second sync signal transmitted from the N-th image sensor 230-N to the first image sensor 230-1 through the interface 330-1 has the first phase as shown in the graph 710, whereas the second sync signal transmitted from the N-th image sensor 230-N to the K-th image sensor 230-K through the interface 330-K has the second phase as shown in the graph 750. The difference of the first phase and the second phase may be 180 degrees. Using the difference of the first phase and the second phase, the electronic device 101 may synchronize the transmission timings, though interference is caused between the second sync signal transmitted from the N-th image sensor 230-N to the first image sensor 230-1 through the interface 330-1 and the second sync signal transmitted from the N-th image sensor 230-N to the K-th image sensor 230-K through the interface 330-K.

As described above, the electronic device 101 according to various embodiments may generate the image of the enhanced quality, by matching the transmission timing of the image data transmitted from the plurality of the image sensors using the second sync signal. In addition, the electronic device 101 according to various embodiments may match the transmission timings even if the interference is caused between the second sync signals, by changing the phase of the second sync signals transmitted to the plurality of the image sensors respectively.

An electronic device as described above according to various embodiments may include a first image sensor (e.g., the first image sensor 230-1), a second image sensor (e.g., the second image sensor 230-2) electrically connected with the first image sensor through a first designated interface (e.g., the interface 330), and a processor (e.g., the processor 120) connected with the first image sensor through a second designated interface (e.g., the interface 340-1) and connected with the second image sensor through a third designated interface (e.g., the interface 340-2), and the processor may be configured to obtain a second image outputted from the second image sensor through the third designated interface, and obtain a first image outputted from the first image sensor through the second designated interface in response to a signal provided to the first image sensor through the first designated interface at an initiation timing for outputting the second image.

In various embodiments, to synchronize an initiation timing of the output of the first image with the initiation timing of the output of the second image, the signal may be provided from the second image sensor to the first image sensor through the first designated interface.

In various embodiments, the processor may be configured to request the first image sensor and the second image sensor to generate the first image and the second image, the first image sensor may be configured to detect first light received through a first lens functionally connected with the first image sensor in response to the request, and the second image sensor may be configured to detect second light received through a second lens functionally connected with the second image sensor, in response to receiving other signal indicating the detection initiated of the first light from the first image sensor. For example, the first image sensor may be configured to generate the first image based on the first light, the second image sensor may be configured to generate the second image based on the second light, and a timing for generating the second image may precede a timing for generating the first image. For example, the second image sensor may further include a memory, and may be configured to store the generated first image in the memory, and in response to receiving the signal from the second image sensor through the first specified interface, output the first image stored in the memory to the processor.

In various embodiments, the first image sensor may be further connected with the second image sensor through a fourth designated interface (e.g., the interface 320), and may be configured to provide the other signal to the second image sensor through the fourth designated interface.

In various embodiments, the processor may be configured to generate a third image by applying white balance to the first image and the second image.

An electronic device as mentioned above according to various embodiments may include a processor (e.g., the processor 120), a first image sensor (e.g., the first image sensor 230-1) connected with the processor through a first interface, a second image sensor (e.g., the second image sensor 230-2) connected with the processor through a second interface, and a third interface (e.g., the interface 330) configured to connect the first image sensor and the second image sensor to synchronize a transmission timing of first data transmitted from the first image sensor to the processor through the first interface and a transmission timing of second data transmitted from the second image sensor to the processor through the second interface.

In various embodiments, the electronic device may further include a fourth interface (e.g., the interface 320) configured to connect the first image sensor and the second image sensor, to synchronize a light detection timing through a first lens of the first image sensor and a light detection timing through a second lens of the second image sensor. For example, the first image sensor may be configured to generate the first data based on the light detected through the first lens of the first image sensor, the second image sensor may be configured to generate the second data based on the light detected through the second lens of the second image sensor, in response to generating the second data, transmit the second data to the processor through the second interface, and in response to generating the second data, change a power level of a signal transmitted to the first image sensor through the third interface, and the first image sensor may be further configured to, based on the change of the power level, transmit the first data to the processor through the first interface. For example, the first image sensor may be configured to identify the change of the power level of the signal, and, in response to identifying, transmit the first data to the processor through the first interface.

In various embodiments, the second image sensor may be configured to, in response to generating the second data, change the power level of the signal transmitted to the first image sensor through the third interface from a first value to a second value which is different from the first value.

In various embodiments, the transmitting timing of the first data may be synchronized with the transmission timing of the second data, by transmitting the first data based on the change of the power level.

In various embodiments, the first image sensor may be configured to, in response to detecting the light through the first lens, change other power level of other signal transmitted to the second image sensor through the fourth interface, and the second image sensor may be configured to, based on the change of the other power level of the other signal, detect the light through the second lens. For example, the light detection timing received through the first lens may be synchronized with the light detection timing received through the second lens, by detecting the light received through the second lens based on the change of the other power level.

In various embodiments, the processor may be configured to receive the first data from the first image sensor through the first interface, receive the second data from the second image sensor through the second interface, and generate an image based at least on the first data and the second data. For example, the third image may be an image applied with auto white balance (AWB).

In various embodiments, the processor may be configured to request the first image sensor to detect the light received through the first lens of the first image sensor through a fourth interface (e.g., the interface 310-1), and request the second image sensor to detect the light received through the second lens of the second image sensor through a fifth interface (e.g., the interface 310-2). For example, the first image sensor may be configured to, generate first analog image data based on the light detected through the first lens, and generate first digital image data converted from the first analog image data as the first data, and the second image sensor may be configured to, in response to the request of the processor, generate second analog image data based on the light detected through the second lens, and generate second digital image data converted from the second analog image data as the second data.

In various embodiments, the first data and the second data may be usable to generate an omnidirectional image.

Figure 8:
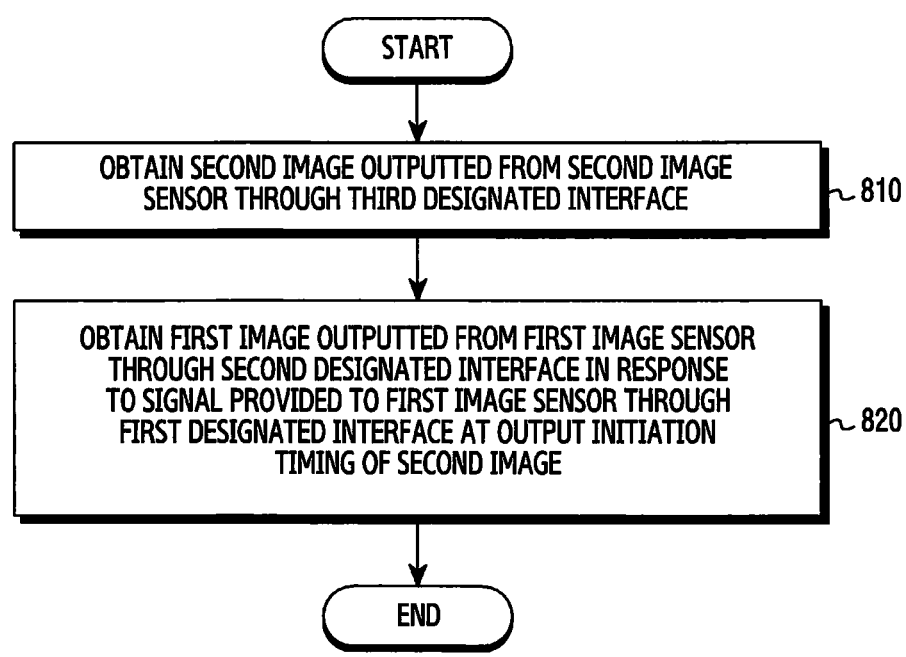
FIG. 8 illustrates an example of operations of an electronic device according to various embodiments.

FIG. 8 illustrates an example of operations of an electronic device according to various embodiments. Such operations may be carried out by the electronic device 101 of FIG. 1, the electronic device 101 of FIG. 3, the electronic device 101 of FIG. 5, or the processor 120 of the electronic device 101.

Referring to FIG. 8, in operation 810, the processor 120 may obtain a second image outputted from the second image sensor 230-2 through the third designated interface 340-2. The second image may be generated based at least on the light detected through the lens connected to the second image sensor 230-2. The second image may be referred to as the second image data. The second image sensor 230-2 may output or transmit the second image to the processor 120, so that the processor 120 may postprocess the second image.

In operation 820, the processor 120 may obtain a first image outputted from the first image sensor 230-1 through the second designated interface 340-1 in response to a signal provided to the first image sensor 230-1 through the first designated interface 330 at the output initiation timing of the second image. In response to outputting the second image or determining to output the second image, the second image sensor 230-2 may provide a signal to the first image sensor 230-1 through the first designated interface 330. The second image sensor 230-2 may provide the signal to the first image sensor 230-1 through the first designated interface 330, to synchronize the transmission timing of the first image transmitted from the first image sensor 230-1 to the processor 120 through the second designated interface 340-1 with the transmission timing of the second image transmitted from the second image sensor 230-2 to the processor 120 through the third designated interface 340-2. The signal may be the second sync signal. In various embodiments, the signal may be transmitted from the second image sensor 230-2 to the first image sensor 230-1 through the first designated interface 330, on a condition of outputting the second image or determining to output the second image. In various embodiments, the signal may be transmitted from the second image sensor 230-2 to the first image sensor 230-1 through the first designated interface 330 regardless of whether the second image or the first image is transmitted. In this case, the power level of the signal or one or more of data included in the signal may be changed on a condition of outputting the second image or determining to output the second image.

In response to receiving the signal, the first image sensor 230-1 may output the first image generated based at least on the light obtained through the lens connected to the first image sensor 230-1 to the processor 120 through the second designated interface 340-1. The generation timing of the first image may precede the generation timing of the second image. To match the output timing of the first image and the output timing of the second image, the first image sensor 230-1 may delay the output of the first image even though the first image is generated before the second image. For the delay, the first image sensor 230-1 may include the memory 305. The first image sensor 230-1 may delay the transmission of the first image, until acquiring the signal from the second image sensor 230-2, by storing at least part of the first image in the memory 305. In response to acquiring the signal, the first image sensor 230-1 may output at least part of the first image stored in the memory 305 to the processor 120.

As stated above, the electronic device 101 according to various embodiments may match the transmission timings of the plurality of the image sensors, through the signaling using the interface (e.g., the first designated interface 330) which connects the plurality of the image sensors having the difference of the image generation rate. Through this matching, the electronic device 101 according to various embodiments may generate the image of the enhanced quality. For example, the processor 120 of the electronic device 101 according to various embodiments may perform a processing operation (AWB, etc.) on at least part of the first image and the second image, by simultaneously receiving the first image and the second image from the first image sensor 230-1 and the second image sensor 230-2 respectively. Through this processing, the processor 120 may create the image of the enhanced quality.

Figure 9:
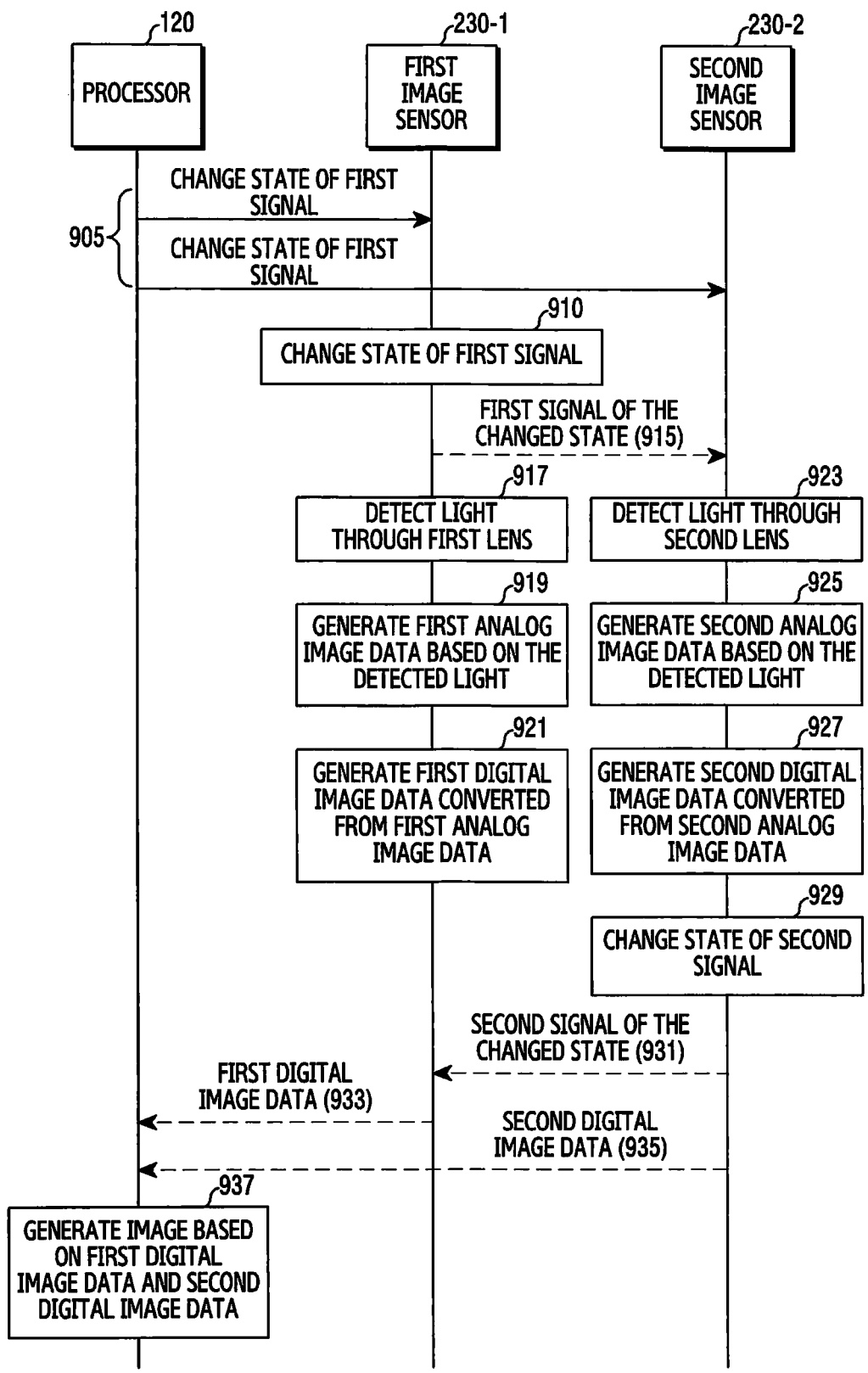
FIG. 9 illustrates an example of signal flows in an electronic device according to various embodiments.

FIG. 9 illustrates an example of signal flows in an electronic device according to various embodiments. Such signal flows may arise in the electronic device 101 of FIG. 1, the electronic device 101 of FIG. 3, or the electronic device 101 of FIG. 5.

Referring to FIG. 9, in operation 905, the processor 120 may request the first image sensor 230-1 and the second image sensor 230-2 to detect light. The processor 120 may transmit a signal for requesting the first image sensor 230-1 to detect the light through the first lens connected to the first image sensor 230-1, and transmit a signal for requesting the second image sensor 230-2 to detect the light through the second lens connected to the second image sensor 230-2. According to embodiments, the transmission of the signal requesting to detect the light through the second lens may be omitted or bypassed. The processor 120 may transmit the signals requesting to detect the light through the interface 310-1 and the interface 310-2 respectively. The first image sensor 230-1 may receive the signal for detecting the light, and the second image sensor 230-2 may receive the signal for detecting the light.

In operation 910, the first image sensor 230-1 may change a state of a first signal. The first signal may be the first sync signal transmitted from the first image sensor 230-1 to the second image sensor 230-2 through the interface 320. The first signal may be used to synchronize the light detection timing of the second image sensor 230-2 with the light detection timing of the first image sensor 230-1. The first image sensor 230-1 may notify the second image sensor 230-2 that the first image sensor 230-1 initiates the light detection, by changing data included in the first signal or changing the power level of the first signal.

Meanwhile, in response to receiving the signal for detecting the light, the second image sensor 230-2 may monitor whether the state of the first signal is changed. Even if receiving the signal for detecting the light from the processor 120, the second image sensor 230-2 may stand by without detecting the light through the second lens.

In operation 915, the first image sensor 230-1 may transmit the first signal of the changed state to the second image sensor 230-2 through the interface 320. The second image sensor 230-2 may receive the first signal of the changed state.

In operation 917, in response to transmitting the first signal of the changed state, the first image sensor 230-1 may detect the light through the first lens. In response to transmitting the first signal of the changed state, the first image sensor 230-1 may initiate the light detection through the first lens.

While FIG. 9 illustrates the example which performs operation 915 and then performs operation 917. According to embodiments, operation 915 and operation 917 may be fulfilled at the same time, or may be fulfilled in reverse order. In other words, operation 915 and operation 917 may be performed regardless of their order.

In operation 919, the first image sensor 230-1 may generate first analog image data based on (or based at least on) the detected light. The first analog image data may include data indicating a first color (e.g., red), data indicating a second color (e.g., green), and data indicating a third color (e.g., blue).

In operation 921, the first image sensor 230-1 may generate first digital image data converted from the first analog image data. The first image sensor 230-1 may generate the first digital image data, by performing the ADC on the first analog image data.

Meanwhile, in response to receiving the first signal of the changed state, the second image sensor 230-2 may detect the light through the second lens, in operation 923. The second image sensor 230-2 may initiate the light detection through the second lens, in response to identifying the state change of the first signal transmitted from the first image sensor 230-1 to the second image sensor 230-2 through the interface 320. The timing for detecting the light through the second lens may correspond to or be identical to the timing for detecting the light through the first lens.

In operation 925, the second image sensor 230-2 may generate second analog image data based on the detected light. The first analog image data may include data indicating a first color (e.g., red), data indicating a second color (e.g., green), and data indicating a third color (e.g., blue).

In operation 927, the second image sensor 230-2 may generate second digital image data converted from the second analog image data. The second image sensor 230-2 may generate the second digital image data, by performing the ADC on the second analog image data.

In operation 929, in response to generating the second digital image data, the second image sensor 230-2 may change a state of a second signal transmitted from the second image sensor 230-2 to the first image sensor 230-1 through the interface 330. The second signal may be used to synchronize the transmission timing of the first digital image data transmitted from the first image sensor 230-1 to the processor 120 through the interface 340-1 and the transmission timing of the second digital image data transmitted from the second image sensor 230-2 to the processor 120 through the interface 340-2. The second signal may be the second sync signal. The second image sensor 230-2 may notify the first image sensor 230-1 that the second image sensor 230-2 transmits the second digital image data to the processor 120, by changing data included in the second signal or by changing the power level of the second signal.

In operation 931, the second image sensor 230-2 may transmit the second signal of the changed state to the first image sensor 230-1 through the interface 330. The first image sensor 230-1 may receive the second signal of the changed state through the interface 330.

In operation 933, in response to receiving the second signal of the changed state, the first image sensor 230-1 may transmit the first digital image data to the processor 120 through the interface 340-1. To synchronize the transmission of the first digital image data with the transmission of the second digital image data, the first image sensor 230-1 may store the first digital image data in the memory 305, instead of generating and transmitting the first digital image data to the processor 120. By storing at least part of the first digital image data in the memory 305, the first image sensor 230-1 may delay the transmission of the first digital image data until the state of the second signal is changed. In response to identifying that the state of the second signal is changed, the first image sensor 230-1 may transmit the first digital image data to the processor 120 through the interface 340-1.

In operation 935, the second image sensor 230-2 may transmit the second digital image data to the processor 120 through the interface 340-2. In various embodiments, in response to generating the second digital image data, the second image sensor 230-2 may transmit the generated second digital image data to the processor 120 through the interface 340-2. In various embodiments, in response to changing the state of the second signal, the second image sensor 230-2 may transmit the generated second digital image data to the processor 120 through the interface 340-2. In various embodiments, in response to transmitting the second signal of the changed state, the second image sensor 230-2 may transmit the generated second digital image data to the processor 120 through the interface 340-2. The processor 120 may receive the first digital image data at a first timing and receive the second digital image data at a second timing. The second timing may correspond to the first timing. In other words, the reception timing of the first digital image data may be identical to or correspond to the reception timing of the second digital image data.

In operation 937, the processor 120 may generate an image based on the first digital image data and the second digital image data. The image may include characteristics of the first digital image data and the characteristics of the second digital image data. The image may be a panorama image, or an omnidirectional image.

As stated above, the electronic device 101 according to various embodiments includes the interface 330 configured to connect the first image sensor 230-1 and the second image sensor 230-2 and the memory 305 of the first image sensor 230-1, and thus may synchronize the operation of the first image sensor 230-1 and the operation of the second image sensor 230-2. Through this synchronization, the processor 120 may reduce computations for creating the image. Through this synchronization, the processor 120 may enhance the quality of the image.

A method of an electronic device as described above according to various embodiments may include obtaining, at a processor of the electronic device, a second image outputted from a second image sensor of the electronic device through a third designated interface, and obtaining, at the processor, a first image outputted from the first image sensor through a second designated interface in response to a signal provided from the second image sensor to the first image sensor through a first designated interface at an initiation timing for outputting the second image.

In various embodiments, to synchronize an initiation timing of the output of the first image with the initiation timing of the output of the second image, the signal may be provided from the second image sensor to the first image sensor through the first designated interface.

In various embodiments, the method may further include requesting, at the processor, the first image sensor and the second image sensor to generate the first image and the second image, detecting, at the first image sensor, first light received through a first lens functionally connected with the first image sensor in response to the request, and detecting, at the second image sensor, second light received through a second lens functionally connected with the second image sensor, in response to receiving other signal indicating the detection initiated of the first light from the first image sensor. For example, the first image sensor may be configured to generate the first image based on the first light, the second image sensor may be configured to generate the second image based on the second light, and a timing for generating the second image may precede a timing for generating the first image. For example, the first image sensor may further include a memory, and may be configured to store the generated first image in the memory, and in response to receiving the signal from the second image sensor through the first specified interface, output the first image stored in the memory to the processor.

In various embodiments, the first image sensor may be further connected with the second image sensor through a fourth designated interface (e.g., the interface 320), and may be configured to provide the other signal to the second image sensor through the fourth designated interface.

In various embodiments, the processor may be configured to generate a third image by applying white balance to the first image and the second image.

The methods according to the embodiments disclosed in the claims or the specification of the present disclosure may be implemented in software, hardware, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the disclosure, it will be noted that various changes may be made therein without departing from the scope of the present disclosure. Thus, the scope of the present disclosure is not limited and defined by the described embodiment, and is defined not only the scope of the claims as below and their equivalents.

What is claimed is:

1. An electronic device comprising:
   a processor;
   a first image sensor connected with the processor through a first interface;
   a second image sensor connected with the processor through a second interface; and
   a third interface configured to connect the first image sensor and the second image sensor to synchronize a transmission timing of first data transmitted from the first image sensor to the processor through the first interface and a transmission timing of second data transmitted from the second image sensor to the processor through the second interface.

2. The electronic device of claim 1, further comprising:
   a fourth interface configured to connect the first image sensor and the second image sensor to synchronize a timing for detecting light received through a first lens of the first image sensor and a timing for detecting light received through a second lens of the second image sensor.

3. The electronic device of claim 2, wherein the first image sensor is configured to generate the first data based on the light detected through the first lens of the first image sensor,
   wherein the second image sensor is configured to:
      generate the second data based on the light detected through the second lens of the second image sensor,
      in response to generating the second data, transmit the second data to the processor through the second interface, and
      in response to generating the second data, change a power level of a signal transmitted to the first image sensor through the third interface, and
   wherein the first image sensor is further configured to, based on the change of the power level, transmit the first data to the processor through the first interface.

4. The electronic device of claim 3, wherein the first image sensor is configured to:
   by transmitting the first data based on the change of the power level, synchronize the transmitting timing of the first data with the transmission timing of the second data.

5. The electronic device of claim 3, wherein the first image sensor is configured to, in response to detecting the light through the first lens, change other power level of other signal transmitted to the second image sensor through the fourth interface, and
   wherein the second image sensor is configured to, based on the change of the other power level of the other signal, detect the light through the second lens.

6. The electronic device of claim 5, wherein the second image sensor is configured to synchronize the timing for detecting the light received through the first lens with the timing for detecting the light received through the second lens, by detecting the light received through the second lens based on the change of the other power level.

7. The electronic device of claim 1, wherein the processor is configured to:
   receive the first data from the first image sensor through the first interface,
   receive the second data from the second image sensor through the second interface, and
   generate an image based at least on the first data and the second data.

8. The electronic device of claim 7, wherein the processor is configured to:
   generate the image, by synthesizing the first data and the second data.

9. The electronic device of claim 8, wherein the processor is configured to:
   synthesize the first data and the second data to make at least part of the generated image more blurry than at least other part of the generated image.

10. The electronic device of claim 8, wherein the processor is configured to:
    generate the image of enhanced brightness, by synthesizing the first data of first brightness and the second data of second brightness.

11. The electronic device of claim 7, wherein the first data and the second data are usable to generate an omnidirectional image.

12. The electronic device of claim 1, wherein the first image sensor further comprising:
    a memory configured to store the first data while delaying the transmission timing of the first image data.

* * * * *